(12) United States Patent
Yabe et al.

(10) Patent No.: US 8,950,003 B2
(45) Date of Patent: Feb. 3, 2015

(54) APPARATUS AND METHOD FOR RESTRICTING THE EXECUTION OF A PROGRAM

(75) Inventors: Yuhei Yabe, Tokyo (JP); Naoya Matsui, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 180 days.

(21) Appl. No.: 13/390,839

(22) PCT Filed: Apr. 20, 2010

(86) PCT No.: PCT/JP2010/002850
§ 371 (c)(1),
(2), (4) Date: Apr. 27, 2012

(87) PCT Pub. No.: WO2011/030478
PCT Pub. Date: Mar. 17, 2011

(65) Prior Publication Data
US 2012/0210444 A1    Aug. 16, 2012

(30) Foreign Application Priority Data
Sep. 8, 2009   (JP) ................................. 2009-207146

(51) Int. Cl.
G06F 21/00       (2013.01)
G09B 7/02        (2006.01)

(52) U.S. Cl.
CPC ........................................ G09B 7/02 (2013.01)
USPC ............................................ 726/28; 386/241

(58) Field of Classification Search
CPC ........ G06F 21/604; G06F 21/62; G06F 21/31
USPC ............................................ 726/28; 386/241
See application file for complete search history.

(56) References Cited

U.S. PATENT DOCUMENTS 6,678,824 B1 *  1/2004  Cannon et al. .................. 726/22
2003/0154217 A1 *  8/2003  Kinno et al. ............... 707/104.1
(Continued)

FOREIGN PATENT DOCUMENTS

FR   WO2004059942      *   7/2004
JP         10268743 A       10/1998
(Continued)

OTHER PUBLICATIONS

Roesner, "User-Driven Access Control: Rethinking Permission Granting in Modern Operating Systems", 2012, IEEE, p. 224-238.*
(Continued)

Primary Examiner — Mahfuzur Rahman
Assistant Examiner — Gregory Lane
(74) Attorney, Agent, or Firm — Matthew B. Dernier, Esq.; Gibson & Dernier LLP

(57) ABSTRACT

An attribute detector detects the attributes of a user of a program. A determining unit determines, based on the detected attribute of a user, whether the user is a superior user for whom usage restriction is not necessary or a subordinate user for whom the usage restriction is necessary, for a program of a first type. The program of the first type is a program appealing to the taste of the user and that is frequently run by the user for many hours. When the user is verified to be the subordinate user and also when the user has executed a program of a second type for a predetermined number of recommended executions, a permission/rejection determining unit permits the execution of the program of the first type.

8 Claims, 4 Drawing Sheets

(56) References Cited

U.S. PATENT DOCUMENTS

| | | | |
|---|---|---|---|
| 2007/0067853 A1* | 3/2007 | Ramsey | 726/28 |
| 2007/0113270 A1* | 5/2007 | Kraemer et al. | 726/4 |
| 2008/0005794 A1* | 1/2008 | Inoue et al. | 726/22 |
| 2010/0169780 A1* | 7/2010 | Bryant-Rich et al. | 715/719 |
| 2010/0183282 A1* | 7/2010 | Gopakumar et al. | 386/95 |
| 2011/0016534 A1* | 1/2011 | Jakobsson et al. | 726/28 |

FOREIGN PATENT DOCUMENTS

| | | | |
|---|---|---|---|
| JP | 11296062 A | | 10/1999 |
| JP | 2001175348 A | | 6/2001 |
| JP | 2004164600 A | | 6/2004 |
| JP | 2005086483 A | | 3/2005 |
| JP | 2006155542 A | | 6/2006 |
| JP | 2006276887 A | | 10/2006 |
| JP | 2007510991 A | | 4/2007 |
| NL | WO2004059942 | * | 7/2004 |
| WO | 9946747 A1 | | 9/1999 |
| WO | 2005045644 A2 | | 5/2005 |

OTHER PUBLICATIONS

International Search Report for the corresponding PCT Application No. PCT/JP2010/002850, dated Jun. 1, 2010.
International Preliminary Report on Patentability and Written Opinion for the corresponding PCT Application No. PCT/JP2010/002850, dated Apr. 11, 2012.
Office Action for the corresponding Japanese Patent Application No. 2009-207146, dated Jun. 1, 2010.
Office Action for the corresponding Japanese Patent Application No. 2009-207146, dated Mar. 29, 2011.
Office Action for the corresponding Japanese Patent Application No. 2009-207146, dated Jan. 31, 2012.

* cited by examiner

APPARATUS AND METHOD FOR RESTRICTING THE EXECUTION OF A PROGRAM

TECHNICAL FIELD

The present invention relates to an apparatus for restricting the execution of a program and, in particular, to an apparatus for restricting the execution of a program on a device connected to a network.

BACKGROUND ART

There are instances of a computer program run on a general-purpose PC (personal computer) or dedicated information terminal device containing depictions of violence or sex which are educationally undesirable for children. The same is also the case for content such as movies, and Patent Document 1 discloses an optical disk reproducer having a parental function that restricts viewing of content based on the personal data on a user viewing the content. By use of a parental function like this, parents can restrict the viewing by children of content which includes depictions educationally undesirable for children.

RELATED ART DOCUMENTS

Patent Documents

[Patent Document 1] Japanese Unexamined Patent Application Publication No. 2005-86483.

The above-mentioned technology is for the restriction of the execution of content based on the depictions therewithin, and not for the restriction of the execution of content designed for children or for entertainment without any depictions to be restricted. Hence, children can run such content for hours on end, and a problem may arise that such a viewing habit depriving children of adequate learning time is educationally undesirable. It is also a wish of the parents that they can restrict the time length of content that can be executed by children. Thus, the inventors have come to realize a possibility of regarding the function of parental restriction on the time length of content viewing as one of parental functions.

Summary of the Invention

The present invention has been made in view of the foregoing problems, and a purpose thereof is to provide a system for controlling the content to be executed by certain users in such a manner as to enable the users to spend balanced hours for entertainment and learning.

In order to solve the aforementioned problems, a program execution restriction apparatus according to one embodiment of the present invention includes: an attribute detector configured to detect an attribute of a user of a program; a determining unit configured to determine, based on the detected attribute of the user, whether the user is a superior user for whom usage restriction is not necessary or a subordinate user for whom the usage restriction is necessary, for a program of a first type, wherein the program of the first type is a program appealing to a taste of the user and that is frequently run by the user for many hours; and a permission/rejection determining unit configured to permit the execution of the program of the first type, when the user is verified to be the subordinate user and when the user has executed a program of a second type for a predetermined number of recommended executions.

Another embodiment of the present invention relates to a method for restricting the execution of a program. The method, executable by a processor, includes: detecting an attribute of a user of the program; determining, based on the detected attribute of the user, whether the user is a superior user for whom usage restriction is not necessary or a subordinate user for whom the usage restriction is necessary, for a program of a first type, wherein the program of the first type is a program appealing to a taste of the user and that is frequently run by the user for many hours; and permitting the execution of the program of the first type, when the user is verified to be the subordinate user and when the user has executed a program of a second type for a predetermined number of recommended executions.

Optional combinations of the aforementioned constituting elements, and implementations of the invention in the form of methods, apparatuses, systems, computer programs, data structures, recording media, and so forth may also be effective as additional modes of the present invention.

The present invention provides a system for controlling the content to be executed by certain users in such a manner as to enable the users to spend balanced hours for entertainment and learning.

DETAILED DESCRIPTION OF THE INVENTION

The preferred embodiments of the present invention (hereinafter referred to as "embodiments") will be described with reference to the accompanying drawings. Hereinbelow, an explanation of a content to be controlled will be given by taking a program as an example.

Figure 1:
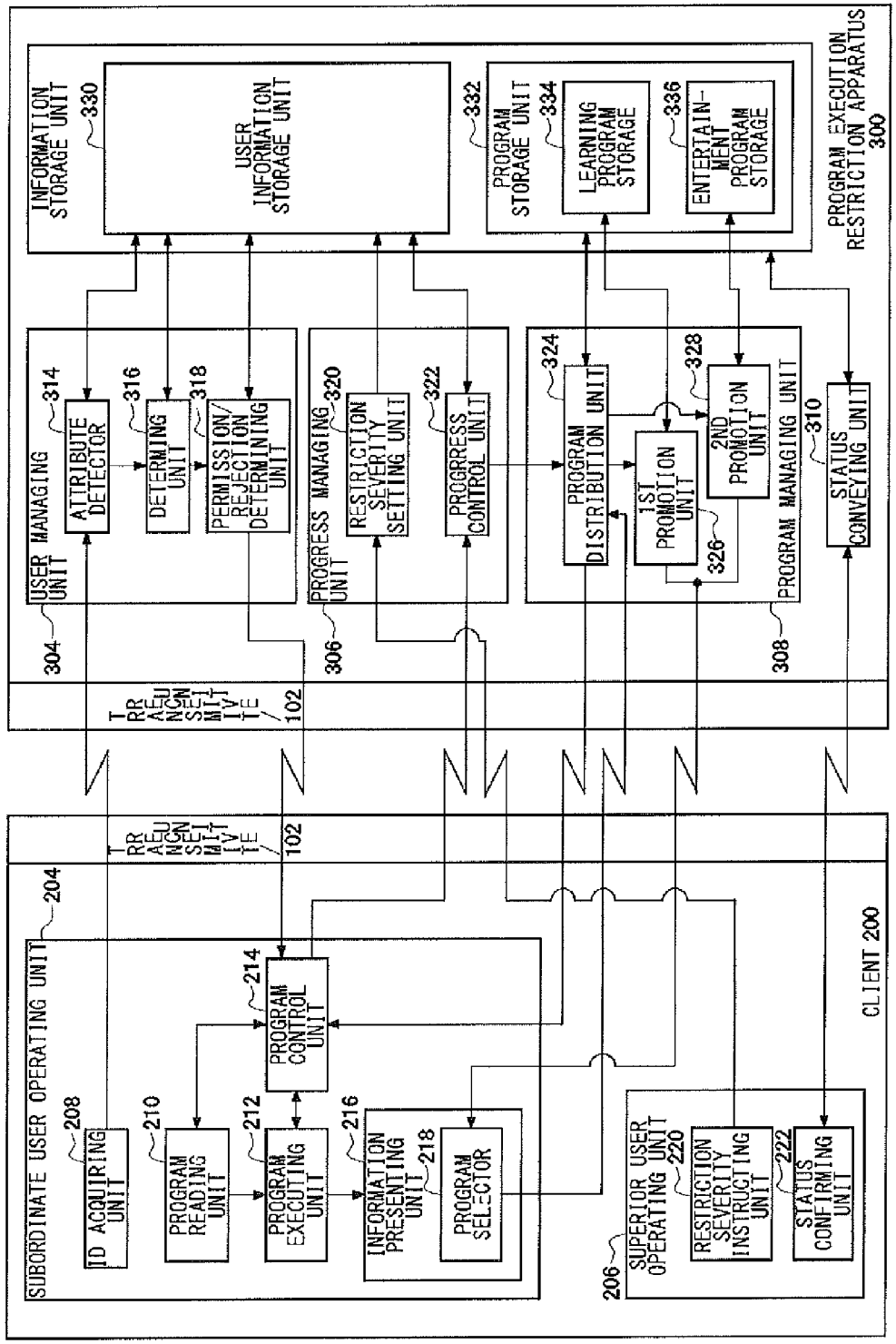
FIG. 1 is a diagram showing a schematic structure of a parental restriction system according to an embodiment of the present invention.

FIG. 1 is a diagram showing a schematic structure of a parental restriction system 100 according to an embodiment of the present invention. The parental restriction system 100 includes a client 200, a program execution restriction apparatus 300, and a transmit/receive unit 102 that connects the client 200 and the program execution restriction apparatus 300 so that they can communicate with each other.

According to this embodiment, the program execution restriction apparatus 300, functioning as a server, restricts programs to be executed at the client 200.

A description will first be given of a structure of the client 200. The client 200 includes a subordinate user operating unit 204 and a superior user operating unit 206.

As used herein, the term "subordinate user" refers to users, among the users using the client 200, who are the target of program execution restriction by the program execution restriction apparatus 300. The concrete examples may be children who are expected to spend balanced hours for learning and entertainment and adults who intend to spend balanced time on work or study and entertainment. Also, the term "superior user" refers to the users, among the users using the client 200, who have the right to intervene in the program restrictions for the subordinate users. Generally, the superior user is the parents of a child or children who are the subordinate user. When the subordinate user is an adult, however, the subordinate user and the superior user can be the same person in some cases. Hereinafter, the term "user" covers both the subordinate user and the superior user. Also, the term "parental restriction" refers to restriction on a program to be executed by the subordinate user by the program execution restriction apparatus 300.

The subordinate user operating unit 204 includes an ID acquiring unit 208, a program reading unit 210, a program executing unit 212, a program control unit 214, and an information presenting unit 216. These functions are performed by combinations of hardware and software. Here, the hardware includes a CPU executing various arithmetic processings, a RAM used as a work area for data storage and program execution, a hard disk drive storing data, communication means such as Ethernet, CD- or DVD-ROM, an optical disk drive, and so forth. A concrete example that can be cited may be a floor-standing type game machine installed in a house. Although not shown, the subordinate user operating unit 204 has an input means such as a controller, a mouse, or a keyboard.

The ID acquiring unit 208 acquires a user ID for operating the client 200. The program reading unit 210 reads in a learning program or an entertainment program. The term "learning program" as used herein refers to a program that helps learning for children or a program that assists work for an adult, that is, a recommendable program to be executed in some way. Also, the term "entertainment program" refers to a game program appealing to the taste of the user, for instance, that is, a program that can often be run by the user for many hours.

These programs are read in from a not-shown hard disk drive or from an optical disk using an optical disk drive. The program executing unit 212 executes a program read in by the program reading unit 210 or a program acquired by the program execution restriction apparatus 300 via the transmit/receive unit 102. The results of the execution of the program are outputted to the information presenting unit 216 such as a liquid crystal monitor.

The program control unit 214 receives the "presence" or "absence" of parental restriction from the program execution restriction apparatus 300 via the transmit/receive unit 102. In response to the presence of parental restriction, the program control unit 214 restricts the reading of the program by the program reading unit 210 or restricts the execution of the program by the program executing unit 212. The program control unit 214, which has four modes (initial mode, superior user mode, parental restriction mode, restriction cancel mode), controls the parental restriction, using these modes as appropriate. A description will be given below of these modes.

The initial mode is a mode that the program control unit 214 first enters when the subordinate user operating unit 204 is booted. In this mode, all the users cannot effect the execution of any entertainment program by the program executing unit 212 or the reading of any entertainment program by the program reading unit 210. The superior user mode is a mode usable when the user operating the subordinate user operating unit 204 is a superior user. In this mode, the user can effect the execution of all programs by the program executing unit 212 and the reading of all programs by the program reading unit 210.

Both the parental restriction mode and restriction cancel mode are the modes for the subordinate user. In the parental restriction mode, the user cannot effect the execution of any entertainment program by the program executing unit 212 or the reading of any entertainment program by the program reading unit 210. If a subordinate user succeeds in fulfilling a restriction severity (level) (to be described later) in the parental restriction mode, the program control unit 214 will switch to the restriction cancel mode. In this mode, the user can execute or read in an entertainment program on a certain condition (such as within a specific time slot or time length for execution).

The program control unit 214 will also transmit the progress status of a program executed by the program executing unit 212 to the program execution restriction apparatus 300 via the transmit/receive unit 102. The "progress status of a program" herein refers to information on the program executed by the subordinate user operating unit 204, which is to be referenced in controlling the balance between entertainment and learning. This information may concern the execution time or the number of stages or areas cleared, for instance, if the program executed is an entertainment program, or the number of problems solved correctly or the execution time of the program, for instance, if the program executed is a learning program.

It is necessary to restrict the use of local resources of the client 200 such as program reading unit 210 if the function of the program control unit 214 is to be performed. This can be accomplished with the program control unit 214 controlling at low level the client 200 by use of hardware such as a dedicated circuit or an operating system having a control over the operation of the client 200.

The superior user operating unit 206 includes a restriction severity instructing unit 220 and a status confirming unit 222. The status confirming unit 222 is a section by which a superior user confirms the progress status of a learning program executed by the subordinate user, which is being managed by the program execution restriction apparatus 300. The restriction severity instructing unit 220 instructs the program execution restriction apparatus 300 about the setting as to the level of execution of a learning program by the subordinate user at which the execution of an entertainment program is permitted.

Hereinbelow, the extent to which a subordinate user must execute a learning program before he/she is permitted to execute an entertainment program, namely, the degree of progress status of a learning program the subordinate user must accomplish in order to effect the switching of the program control unit 214 from the restriction mode to the restriction cancel mode will be referred to as "restriction severity". More specifically, it is the execution time of a learning program to be executed by the subordinate user, the attainment level of learning process offered by a learning program (e.g., the number of questions answered correctly, test score, etc.), the number of subjects where learning programs are offered for individual subjects, or the mandatory subjects or areas thereof to be learned. Also, included in the restriction severity are the details of the restriction cancel mode, that is, the time slot or running time during which the subordinate user can execute an entertainment program, the number of stages or areas to be cleared, and so forth.

The superior user operating unit 206 can be implemented on the same device as the subordinate user operating unit 204. Yet, the superior user operating unit 206 does not require the sophisticated arithmetic processing capabilities necessary to execute learning or entertainment programs. Thus, the superior user operating unit 206 may be implemented by any of the devices that can be connected to the program execution restriction apparatus 300 via some communication means, such as an information terminal, like a mobile phone, in the superior user's possession or a PC in the superior user's place of work. As such, the superior user has an advantage in that he/she can change the restriction severity or check the status while away from home at his/her place of work, for instance.

The status confirming unit 222 can be implemented using a passive means such as a mailer for receiving the progress status which is regularly sent from the program execution restriction apparatus 300, for instance, by use of electronic mail. Also, it may be implemented by use of an active means, in which a progress status viewing site offered by the program execution restriction apparatus 300, for example, is accessed using a Web browser to confirm the content. Whether to use either or both of the above-mentioned means can be freely decided according to the taste of the superior user.

Next, a description will be given of a structure of a program execution restriction apparatus 300. The program execution restriction apparatus 300 is a server having the function of executing parental restrictions in connection with a multiplicity of clients 200 via communication means, such as the Internet, through its transmit/receive unit 102.

The program execution restriction apparatus 300 includes a user managing unit 304, a progress managing unit 306, a program managing unit 308, a status conveying unit 310, and an information storage unit 312.

The information storage unit 312 includes a user information storage unit 330 and a program storage unit 332. The program storage unit 332 includes a learning program storage 334 and an entertainment program storage 336. The learning program storage 334 stores learning or educational programs to be offered to the user. Similarly, the entertainment program storage 336 stores entertainment programs to be offered to the user.

The user information storage unit 330 stores user IDs and attributes associated with each other. The term "user ID" as used herein refers to an identifier by which the user operating the subordinate user operating unit 204 is identified. It is, for example, a login name for a log-in to the program execution restriction apparatus 300, which is a server on the network, or a pattern of the user's fingerprint, vein, or iris where biometric authentication is to be performed. Also, the "attribute of the user" is personal information on the user or information intrinsic to the subordinate user operating unit 204 operated by the user. Whereas the examples of the former include the user's age, school, textbooks, choice of school and the like, the examples of the latter include the MAC (Media Access Control) address of the subordinate user operating unit 204, the serial number or identification number thereof given by a manufacturer, and the like. Stored in the user information storage unit 330 are the attributes of the users and the presence or absence of necessity for parental restriction associated with each other. Also, where there is necessity for parental restriction, the restriction severity and the progress status of a learning program are stored in association with the user ID.

The user managing unit 304 includes an attribute detector 314, a determining unit 316, and a permission/rejection determining unit 318. The attribute detector 314 first acquires the user ID from the ID acquiring unit 208 through the transmit/receive unit 102. Next the attribute detector 314 acquires the attributes of the users from the user information storage unit 330 based on the acquired ID.

The determining unit 316 receives the attribute of the user from the attribute detector 314 and determines whether parental restriction is necessary or not for this particular user based on the attribute. For example, where the age is referenced as the attribute of the user, the determining unit 316 determines that parental restriction is necessary if the user's age is a predetermined age or below. The "predetermined age" as used herein refers to a reference age by which to decide whether or not the user is of an age for which learning is considered essential. For instance, it is set to 15, which is the oldest age subject to compulsory education. As another example, where the MAC address of the subordinate user operating unit 204 is referenced as the attribute of the user, the necessity for parental restriction or the absence of parental restriction is determined by the superior user in advance, and the determination is made accordingly. If the setting is such that parental restriction always works on a certain user of the subordinate user operating unit 204, then the determining unit 316 checks on the MAC address and determines that parental restriction is necessary. As already mentioned, the attributes of the users and the presence or absence of necessity for parental restriction are stored in the user information storage unit 330 in such a manner that they are associated with each other. The determining unit 316 accesses the user information storage unit 330 and determines the presence or absence of necessity for parental restriction, based on the attribute acquired from the attribute detector 314.

The permission/rejection determining unit 318 receives the presence or absence of necessity for parental restriction from the determining unit 316. Where there is necessity for parental restriction, the permission/rejection determining unit 318 accesses the user information storage unit 330 and confirms the progress status of a learning program by the user. If the progress status of a learning program is found to be meeting the criteria set by the restriction severity, the permission/rejection determining unit 318 will permit the execution of an entertainment program at the subordinate user operating unit 204, thereby switching the program control unit 214 to the restriction cancel mode. If the progress status of a learning program is not found to be meeting the criteria set by the restriction severity, the permission/rejection determining unit 318 will instruct the program control unit 214 to switch to the parental restriction mode via the transmit/receive unit 102. Note, however, that when the user is a superior user, the permission/rejection determining unit 318 instructs the program control unit 214 to switch to the superior user mode via the transmit/receive unit 102.

It should be noted here that where the parental restriction is quantitatively defined in the manner of the number of problems to be solved correctly per day or the number of subjects of learning program to be executed, for instance, there may be cases where a subordinate user finishes three days of learning in a single day. In such a case, the arrangement may, for instance, be such that the program control unit 214 is instructed to switch to the restriction cancel mode in which the user can execute entertainment programs without learning on the second and third days.

The progress managing unit 306 includes a restriction severity setting unit 320 and a progress control unit 322. The restriction severity setting unit 320 changes the restriction severity stored in the user information storage unit 330, based on the restriction severity instructed from the restriction severity instructing unit 220 via the transmit/receive unit 102.

The progress control unit 322 manages the progress of a program executed by the subordinate user operating unit 204. More specifically, the progress control unit 322 acquires the progress status of learning programs from the program control unit 214 via the transmit/receive unit 102. And if the subordinate user has completed one learning program to the end, the progress control unit 322 will instruct a program distribution unit 324 (described later) to distribute another learning program to the subordinate user operating unit.

The program managing unit 308 includes a program distribution unit 324, a first promotion unit 326, and a second promotion unit 328. The program distribution unit 324 receives information on a learning program to be distributed from the progress control unit 322. Then the program distribution unit 324 accesses the learning program storage 334 and acquires the learning program. Finally, the program distribution unit 324 distributes the thus acquired learning program to the program control unit 214 via the transmit/receive unit 102.

Depending on the restriction severity, there are cases where the execution of an entertainment program is not permitted unless a plurality of learning programs are completed. In such a case, the program distribution unit 324 utilizes the first promotion unit 326. That is, the program distribution unit 324 instructs the first promotion unit 326 to present learning programs to the subordinate user in such a manner that the learning programs are selectable from among a plurality of programs stored in the learning program storage 334. The first promotion unit 326 presents the selectable programs to the program selector 218 in the information presenting unit 216 via the transmit/receive unit 102. The program selector 218 achieves its function by use of GUI (Graphic User Interface), for instance, and the user selects a desired program by the input means, such as a controller, through the operation of the GUI. The information on the selected program is transmitted to the program distribution unit 324 via the transmit/receive unit 102. The program distribution unit 324 acquires the learning program by accessing the learning program storage 334, and distributes the acquired learning program to the program control unit 214 via the transmit/receive unit 102.

At this stage, the subordinate user can select one program from among the plurality of programs presented to the program selector 218 or select a plurality of types of programs all at one time. The former structure may be implemented, for instance, in a case where once a learning program has been completed, the difficulty level of the next learning program is adaptively varied according to the degree of attainment of the completed program. Also, the latter structure may be convenient in such a case where a subordinate user, who is highly motivated to study, executes the learning programs all at one time.

On the other hand, the second promotion unit 328 presents a plurality of entertainment programs thereto in such a manner that the entertainment programs are selectable. This method itself is the same as that implemented by the first promotion unit 326. Preparation of a plurality of entertainment programs executable by the subordinate user who has completed a learning program motivates the subordinate user to use the parental restriction system 100 of the present embodiment.

The status conveying unit 310 is a section that conveys the progress status of a learning program by the subordinate user, to the superior user, as appropriate. The status conveying unit 310 can convey the progress status of a learning program, according to the instruction from the status confirming unit 222, by use of an HTTP server (Hypertext Transfer Protocol over Secure Socket Layer server) provided in the form of websites protected by security. Or the status conveying unit 310 can convey the progress status of a learning program, according to the instruction from the status confirming unit 222, by use of a mail server that sends the progress status of a learning program of user stored in the user information storage unit 330.

Each function of the above-described program execution restriction apparatus 300 is realized by hardware, such as a CPU for executing various arithmetic processings, a RAM for data storage and used as work area for executing programs, a hard disk drive for storing the data, communication means (e.g., Ethernet), and optical disk drive (e.g., CD, DVD-ROM), in cooperation with software.

Finally, a description is given of a mechanism with which to restrict the programs executed at the client 200, in cooperation between the client 200 and the program execution restriction apparatus 300.

As a subordinate user is newly registered in the program execution restriction apparatus 300 which is a server, the restriction severity, which is prepared as an initial value by the program execution restriction apparatus 300, is set to the subordinate user who is subjected to parental restriction. The restriction severity prepared as the initial value is determined based on the age of the user, for instance.

The restriction severity prepared as the initial value can be freely changed by the superior user if a change of the restriction severity is instructed from the restriction severity instructing unit 220 to the restriction severity setting unit 320 via the transmit/receive unit 102. When the restriction severity setting unit 320 receives from the restriction severity instructing unit 220 an instruction with which to change the restriction severity, the restriction severity setting unit 320 changes the restriction severity of the subordinate user stored in the user information storage unit 330.

Figure 2:
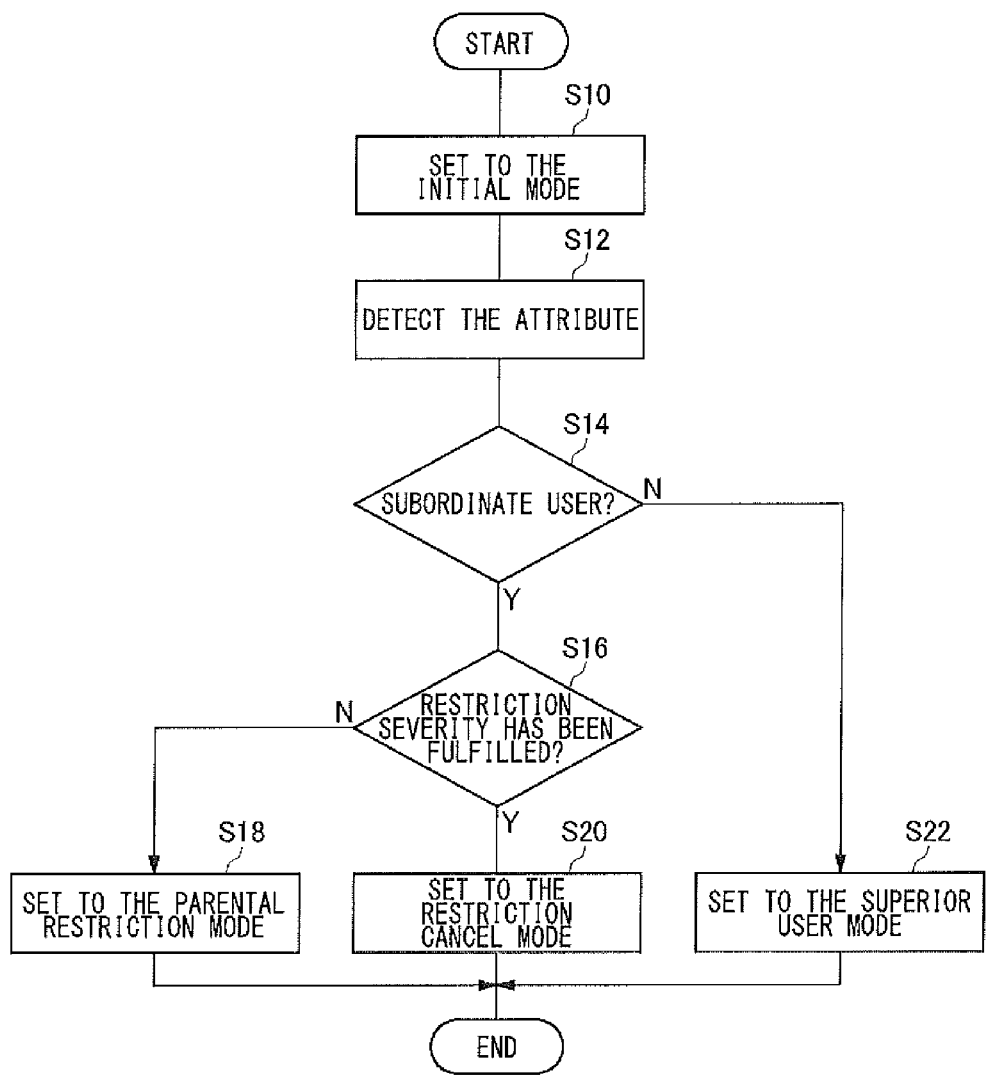
FIG. 2 is a flowchart showing a flow from the start-up of a subordinate user operating unit of FIG. 1 to the setting of a mode in a program control unit.

FIG. 2 is a flowchart showing a flow from the start-up of the subordinate user operating unit 204 to the setting of a mode in the program control unit 214. The processing in this flowchart starts at start-up of the subordinate user operating unit 204.

Upon the start-up of the subordinate user operating unit 204, the program control unit 214 is set to an initial mode (S10). As the user logs in to the program execution restriction apparatus 300, the attribute detector 314 detects the attribute of the user (S12). As a result, when it is determined by the determining unit 316 that the user is a subordinate user (Y of S14), the permission/rejection determining unit 318 checks to see if the user succeeds in fulfilling the restriction severity. If the user succeeds in fulfilling the restriction severity (Y of S16), the program control unit 214 will be set to the restriction cancel mode (S20). If the user does not fulfill the restriction severity (N of S16), the program control unit 214 will be set to the parental restriction mode (S18). If the user is a superior user (N of S14), the program control unit 214 will be set to the superior user mode (S22). As the program control unit 214 is set to the either mode, the processing terminates.

If the program control unit 214 switches to the parental control mode, the program control unit 214 will transmit the progress status of the learning program by the subordinate user, to the progress control unit 322 via the transmit/receive unit 102. The progress control unit 322 references the restriction severity acquired from the user information storage unit 330. And if the user has completed one learning program to the end, the progress control unit 322 will determine whether another learning program is necessary or not. If another learning program is necessary, the progress control unit 322 will instruct the program distribution unit 324 to distribute another learning program. Also, the progress status of the learning program sent from the program control unit 214 is each time reflected in the user information storage unit 330. If the subordinate user attains the restriction severity through a progress of the learning program, the permission/rejection determining unit 318 will permit the program control unit 214 to execute an entertainment.

As the program distribution unit 324 is instructed from the progress control unit 322 to distribute another learning program, the program distribution unit 324 checks to see if there are a plurality of candidates for the learning programs. If there is only a single candidate for the learning program, the program distribution unit 324 will transmit the program to the program control unit 214 via the transmit/receive unit 102. If there are a plurality of candidates for the learning program, the program distribution unit 324 will instruct the first promotion unit 326 to present the plurality of candidates to the program selector 218 via the transmit/receive unit 102. When a program is selected by the user, the program selector 218 transmits the information on the selected program to the program distribution unit via the transmit/receive unit 102. The program distribution unit 324 acquires the program sent from the program selector, from the learning program storage 334 and then transmits said program to the program control unit 214 via the transmit/receive unit 102.

Figure 3:
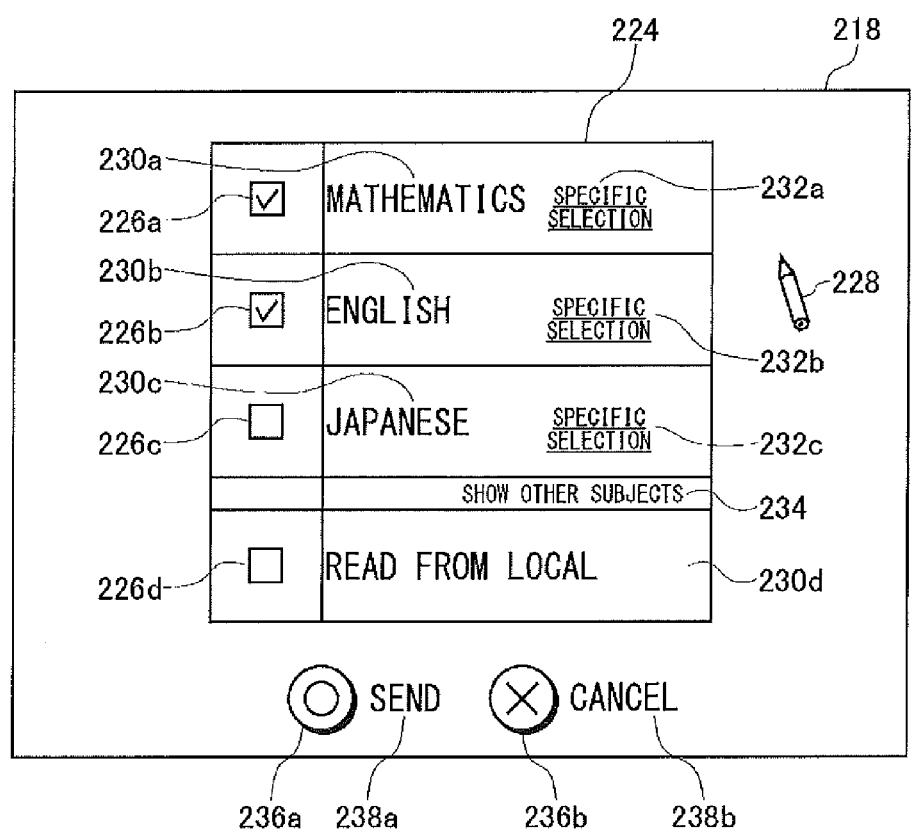
FIG. 3 illustrates an example of a program selector displayed on an information presenting unit by the first promotion unit.

FIG. 3 illustrates an example of a program selector 218 displayed on the information presenting unit 216 by the first promotion unit 326. Displayed in a learning program selection table 224 created by use of the GUI technique are the names of subjects, namely, mathematics, English, Japanese (230a, 230b, 230c), presented to the user. Outside the table is a cursor 228 that can be moved by instructions from the user. The cursor can be moved by operating a not-shown input device such as a mouse or a controller.

The user can go to a screen (not shown) for selecting subjects other than the above by moving the cursor 228 onto "Display Other Subjects" (234) and making a selection. Also, the user can freely move the cursor 228 to any of the check buttons 226a to 226c corresponding to the respective subjects and select it.

Where a learning program the user has in a hard disk or the like (not shown), not a program presented by the first promotion unit 326, is to be executed, the user selects the check button 226d corresponding to "Read from Local" (230d). With the check button 226d selected, the program control unit 214 instructs the reading of a program from the program reading unit 210.

The user can select specific aspects of the subject he/she learns. The user can go to a specific selection screen (not shown) by selecting "Specific Selection" (232a to 232c) displayed next to the subject, using the cursor 228. On this screen, the user can select a course unit of each subject (e.g., Contemporary Writings, Japanese classics, Chinese classics, or the like if the subject is Japanese), the number of problems to solve, and the like.

Upon completion of all necessary selections, the user transmits the selections to the program distribution unit 324 by selecting "Send" (238a) with the cursor 228 or pressing a "o" (circle) button on the controller or the like. Or if the user wants to discontinue the selecting process, the user can discontinue the operation by selecting "Cancel" (238b) with the cursor 228 or pressing a "×" (cross) button on the controller or the like. The correspondence between the buttons of the controller or the like and "Send" and "Cancel" is displayed by their respective icons (236a and 236b) at the bottom portion of the information presenting unit 216. Note that the aforementioned "reading from local" starts its operation after the user selects "Send" (238a).

Now, as the subordinate user fulfils the restriction severity and thus the execution of an entertainment program is permitted from the program control unit 214, the program control unit 214 switches to the restriction cancel mode. Then the program control unit 214 instructs the progress control unit 322 to present an entertainment program via the transmit/receive unit 102. The progress control unit 322 conveys this instruction to the program distribution unit 324, and the program distribution unit 324 instructs the second promotion unit 328 to present a display enabling the selection of a plurality of entertainment programs at the program selector 218 via the transmit/receive unit 102. The subordinate user may select an entertainment program to run from among those presented or may run an entertainment program in his/her possession by loading it from the program reading unit 210. The subordinate user can execute the entertainment program according to the rules set by the restriction severity.

Figure 4:
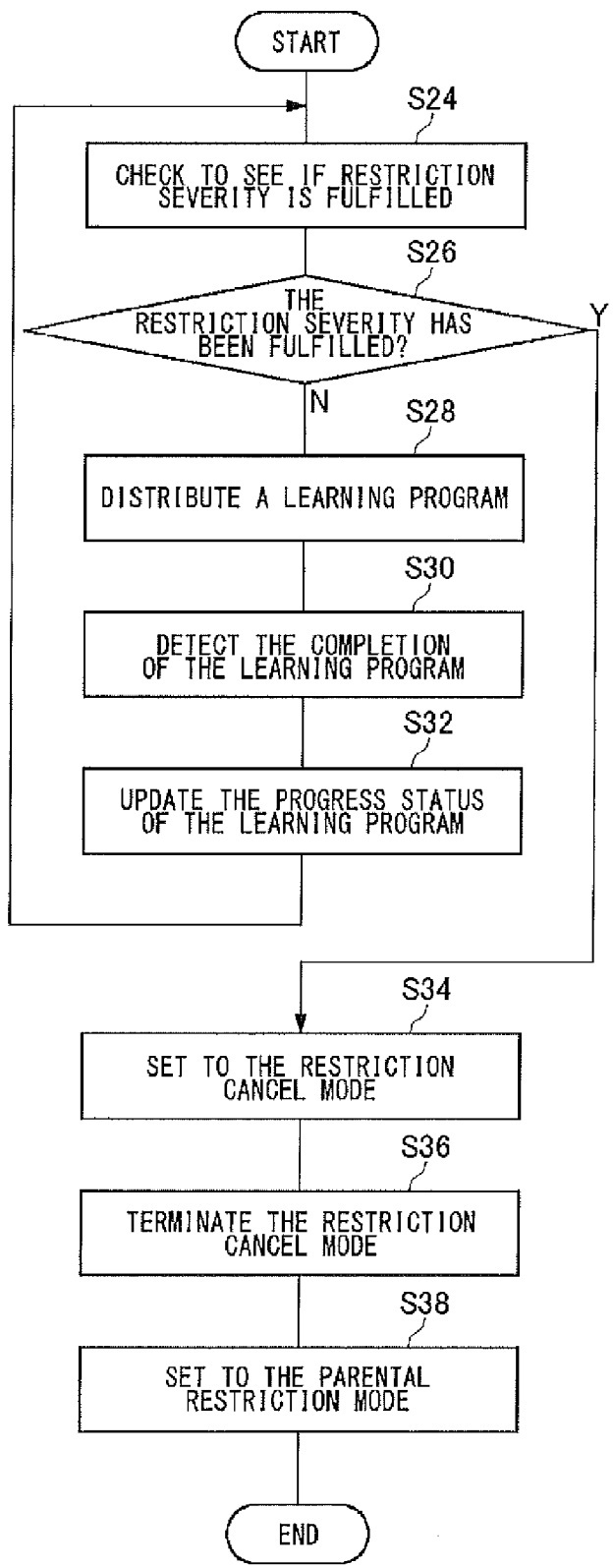
FIG. 4 is a flowchart showing a flow up to the switching to a restriction cancel mode when a program control unit of FIG. 1 is in a parental restriction mode.

FIG. 4 is a flowchart showing a flow up to a stage where the program control unit 214 switches the mode to the restriction cancel mode and again returns to the parental restriction mode, when the program control unit 214 is in a parental restriction mode. The processing in this flowchart starts when the program control unit 214 is set to the parental restriction mode.

The permission/rejection determining unit 318 accesses the user information storage unit 330 and checks to see if the subordinate user succeeds in fulfilling the restriction severity (S24). If the restriction severity is not fulfilled (N of S26), the program control unit 214 will instruct the progress control unit 322 to distribute a learning program. Upon receipt of the instruction, the program distribution unit 324 distributes the learning program to the subordinate user (S28). As it is detected that the subordinate user has completed the learning program (S30), the program control unit 214 transmits the progress status of the learning program to the progress control unit 322 and then the progress control unit 322 updates the information stored in the user information storage unit 330 (S32). Upon completion of the updating, the process returns to Step for checking to see if the restriction severity is fulfilled (S24). As, in this manner, the subordinate user fulfills the restriction severity (Y of S26), the program control unit 214 is set to the restriction cancel mode (S34). While the program control unit 214 is in the restriction cancel mode, the subordinate user can execute an entertainment program within the restriction contents defined in the content of the restriction cancel mode. Here, the restriction contents defined therein may include the time slot or running time during which the subordinate user can execute the entertainment program, the number of stages or areas to be cleared, and so forth. As the restriction cancel mode ends (S36), the program control unit 214 is again set to the parental control mode (S38).

The progress status of the learning program by the subordinate user and the type and the running time of the entertainment program executed by the subordinate user are transmitted by the program control unit 214 to the progress control unit via the transmit/receive unit 102. The progress control unit 322 stores the user IDs and the progress status thereof and the type and the running time thereof in such a manner that they are associated with each other. The status conveying unit 310 acquires the progress status of the learning program by the subordinate user and so forth from the user information storage unit 330, and conveys them to the status confirming unit 222 through electronic mail, for instance. The superior user can check the progress status of the learning by the subordinate user and so forth by reading the electronic mail received by the status confirming unit 222. Also, the superior user may access the status conveying unit 310 via the status confirming unit 222 and browse a website, provided by the status conveying unit 310, which posts the progress status of the learning by the subordinate user and so forth. This allows the superior user to check the progress status of the learning by the subordinate user and so forth. These progress statuses may be periodically (e.g., once a month) printed out and sent by mail to the superior user.

The present invention has been described based upon illustrative embodiments. These exemplary embodiments are intended to be illustrative only and it will be obvious to those skilled in the art that various modifications to the combination of constituting elements and processes could be developed and that such modifications are also within the scope of the present invention.

A description has been given above from the viewpoint where the parents control the execution of contents by children to enable the children to spend balanced hours for entertainment and learning. However, the parental restriction system 100 may parallely implement the parental restriction function as one conventionally understands it. For example, even when the program control unit 214 is in the restriction cancel mode, the execution thereof is restricted if a program to be executed by a subordinate user contains depictions of violence or sex. In this case, the attribute of a user or user ID and the necessity of parental restriction in the conventional sense may be stored in the user information storage unit 330 in such a manner they are associated with each other.

In the above description, the second promotion unit 328 presents a plurality of entertainment contents to the subordinate user in a selectable manner, when the program control unit 214 is switched to the restriction cancel mode. However, the embodiment is not limited thereto and the number of entertainment programs to be presented here may increase or decrease depending on the progress status of the learning program.

In the above description, the status conveying unit 310 conveys the progress status of a learning program by a specific subordinate user, to the superior user. However, the embodiment is not limited thereto and relative scores or results of the subordinate user among the users who have registered as users in the program execution restriction apparatus 300 (e.g., score ranking and deviation value) may be provided instead. In this case, the superior user may freely set the general population of registered users which will be used to calculate the scores. Specific examples of the general population may be the users of the same age, the users who have solved the same test problems, the users in the same area or community, the users who chose the same school to attend next as their first choice, and so forth. This can be accomplished as follows. That is, the superior user indicates a specific general population to the status conveying unit 310 from the status confirming unit 222 via the transmit/receive unit 102. Then the status conveying unit 310 accesses the user information storage unit 330, calculates the aforementioned relative scores, and conveys the relative scores to the superior user.

An arrangement may be such that whether such a relative score is to be supplied to the subordinate user as well or not is selectable by the superior user. This is because there may be cases where the subordinate user, who is once notified of the relative scores of other users, is driven by a sense of competition and, as a result thereof, he/she is motivated to carry on the learning program. For this arrangement, when the superior user has the status confirming unit 222 instruct the status conveying unit 310 to notify the subordinate users as well of the relative scores thereof via the transmit/receive unit 102, a subordinate-user score conveying unit (not shown) presents them to the information presenting unit 216 via the transmit/receive unit 102.

In order for the superior user to set whether the general population or score is to be disclosed or not, it is useful to have the status conveying unit 310 function as an HTTPS server. This is because the superior user can visually and interactively perform the setting of whether the general population is to be set or not and/or whether the scores are to be disclosed or not, through a website.

It is assumed in the above description that parents are the superior users and their children are the subordinate users. However, the embodiment is not limited thereto, and the superior users may be teachers at school or private tutoring schools and the subordinate users may be their students. In this case, setting a common restriction severity for the subordinate users allows provision of a place like a virtual classroom using a network. In so doing, the arrangement may be such that the subordinate users communicate with other users using a Web camera, a microphone and so forth.

In the above description, the program control unit 214 does not switch the mode to the restriction cancel mode unless the subordinate user fulfils the restriction severity. However, the embodiment is not limited thereto and the arrangement may be such that the program control unit 214 is switched to the restriction cancel mode under a specific condition (e.g., birthday of the subordinate user or Christmas Day).

A description has been given above of a case where the client 200 and the program execution restriction apparatus 300 are constantly connected to each other by use of the communication means. In case the connection is interrupted for some reasons (e.g., trouble with a server which is the program execution restriction apparatus 300 here), the program control unit 214 may be provided with a simple parental restriction mode. This simple parent restriction mode is a mode which can be started from the initial mode by operating a not-shown switch of the subordinate user operating unit 204 and a mode selector in an operating system, for instance. Also, this simple parent restriction mode can run the entertainment program for a predetermined time length. Here, the "predetermined time length" is the running time of an entertainment program that can be executed in return for the learning program executed and is determined depending on the progress status of the learning program. For example, the "predetermined time length" may be equal to the running time of the learning program or time length obtained by multiplying this running time thereof by a constant which is greater than zero. Or the "predetermined time length" may be determined according to the number of questions answered correctly or test score. A learning program stored locally in the subordinate user operation unit 203, that read in from the optical disk in the user's possession or the like may be used as the learning program.

By implementing the above-described configurations and operations, the inconvenience case where no entertainment program can be run can be avoided even when the client 200 and the program execution restriction apparatus 300 are disconnected from each other for some reasons. Note that the superior user can freely change the relation between the predetermined time length and the progress status of a learning program, via the restriction severity instructing unit 220, as long as the client 200 and the program execution restriction apparatus 300 are being connected to each other.

In the above description, there may be cases where the running time of an entertainment program is restricted to within a predetermined time length if the program control unit 214 is in the parental restriction mode or in the simple parental restriction mode. In such a case, an inconvenience may arise where the predetermined time length has passed while an entertainment program that needs to be saved is still running and consequently it cannot be saved. To address such a problem, when the program control unit 214 is in the parental restriction mode or the simple parental restriction mode, the images while the entertainment program is running (images loaded in a RAM such as the program itself or data) may be stored in a hard disk or the like so that the image can be restored later.

A description is given above of an example where entertainment programs are used as contents to which the parental restriction is subjected. However, the embodiment is not limited thereto, and those contents may be images such as movies or animation (moving images).

EXPLANATION OF REFERENCE NUMERALS

100 Parental restriction system
102 Transmit/receive unit
200 Client
204 Subordinate user operating unit
206 Superior user operating unit
208 ID acquiring unit
210 Program reading unit
212 Program executing unit
214 Program control unit
216 Information presenting unit
218 Program selector
220 Restriction severity instructing unit
222 Status confirming unit
224 Learning program selection table
226 Check button
228 Cursor
300 Program execution restriction apparatus
304 User managing unit
306 Progress managing unit
308 Program managing unit
310 Status conveying unit
312 Information storage unit
314 Attribute detector
316 Determining unit
318 Permission/rejection determining unit
320 Restriction severity setting unit
322 Progress control unit
324 Program distribution unit
326 First promotion unit
328 Second promotion unit
330 User information storage unit
332 Program storage unit
334 Learning program storage
336 Entertainment program storage The present invention may be used for a device for restricting the execution of a program and particularly used to restrict the execution of programs in a device connected to a network.

The invention claimed is:

1. A program execution restriction apparatus connecting to a plurality of clients via a communication means, the apparatus comprising:
an attribute detector operating to acquire a user attribute from a user requesting access to a program in any of the plurality of clients via the communication means;
a user information storage unit operating to store user attributes associated with a restriction flag;
a determining unit operating to determine, by referencing the user information storage unit based on the acquired user attribute, whether the user is a superior user or a subordinate user and to determine whether a restriction is placed if the determination is made that the acquired user attribute has an associated restriction flag;
a permission/rejection determining unit operating to place a restriction mode on a user when the user is determined to be a subordinate user, whereby access to a program of an entertainment type is restricted and access to a program of a learning type is permitted,
wherein the permission/rejection determining unit receives a progress status from a subordinate user of completion of a program of a learning type, and when the progress status meets a certain threshold, suspends the restriction mode on the subordinate user so that access to a program of an entertainment type is permitted; and
a status conveying unit operating to convey to the superior user, via the communication means, a relative result of the subordinate user in a plurality of users registered in the program execution restriction apparatus, the relative result being defined in a general population set according to an instruction of the superior user.

2. A program execution restriction apparatus according to claim 1, further comprising a restriction severity setting unit operating to set, according to an instruction from the subordinate user, as to a level of execution of the leaning program by the user at which the execution of the entertainment is permitted.

3. A program execution restriction apparatus according to claim 1, further comprising a first promotion unit operating to present a learning program to the user in such a manner that the learning program is selectable from among a plurality of learning programs.

4. A program execution restriction apparatus according to claim 1, further comprising a progress control unit operating to perform an operation such that when the subordinate user has completed one entertainment program, another program of entertainment program is offered to the subordinate user.

5. A program execution restriction apparatus according to claim 1, further comprising a second promotion unit operating to present an entertainment program to the user in such a manner that the entertainment program is selectable from among a plurality of entertainment programs.

6. A method, for restricting the execution of a program, executable by a processor, the method comprising:
acquiring a user attribute from a user requesting access to a program in any of a plurality of clients connected via a communication means;
storing user attributes associated with a restriction flag;
determining, by referencing an acquired user attribute, whether the user is a superior user or a subordinate user and determining whether a restriction is placed if a determination is made that the acquired user attribute has an associated restriction flag;
placing a restriction mode on a user when the user is determined to be a subordinate user, whereby access to a program of an entertainment type is restricted and access to a program of a learning type is permitted;
receiving a progress status from a subordinate user of completion of a program of a learning type, and, when the progress status meets a certain threshold, suspending the restriction mode on the subordinate user so that access to a program of an entertainment type is permitted; and
conveying to the superior user, via the communication means, a relative result of the subordinate user in a plurality of users using the plurality of clients, the relative result being defined in a general population set according to an instruction of the superior user.

7. A program embedded in a non-transitory computer-readable medium, the program comprising:
an acquiring module operative to acquire a user attribute from a user requesting access to a program in any of a plurality of clients connected via a communication means;
a user information storage module operative to store user attributes associated with a restriction flag;
a determining module operative to determine, based on an acquired user attribute, whether the user is a superior user or a subordinate user and to determine whether a restriction is placed if the determination is made that the acquired user attribute has an associated restriction flag;

a permitting module operative to place a restriction mode on a user when the user is determined to be a subordinate user, whereby access to a program of an entertainment type is restricted and access to a program of a learning type is permitted, wherein the permitting module receives a progress status from a subordinate user of completion of a program of a learning type, and when the progress status meets a certain threshold, suspends the restriction mode on the subordinate user so that access to a program of an entertainment type is permitted; and a conveying module operative to convey to the superior user, via the communication means, a relative result of the subordinate user in a plurality of users using the plurality of clients, the relative result being defined in a general population set according to an instruction of the superior user.

8. The apparatus according to claim 2, wherein:

the general population for calculating the relative result of the subordinate user can be freely set by the superior user, and the restriction severity setting unit operates to set, according to an instruction provided from the superior user using a device different from the client controlled by the subordinate user, as to a level of execution of the leaning program by the subordinate user at which the execution of the entertainment is permitted.

* * * * *